United States Patent [19]

Darsey

[11] Patent Number: 5,634,236
[45] Date of Patent: Jun. 3, 1997

[54] NON-CONTACT FIBER CLEANING AND TENSIONING DEVICE

[75] Inventor: Ralph J. Darsey, Lawrenceville, Ga.

[73] Assignee: Lucent Technologies Inc., Murray Hill, N.J.

[21] Appl. No.: 498,314

[22] Filed: Jul. 5, 1995

[51] Int. Cl.$^6$ ...................................................... B08B 1/02
[52] U.S. Cl. ............................ 15/309.1; 15/302; 15/345
[58] Field of Search ............................... 15/302, 306.1, 15/309.1, 345

[56] References Cited

U.S. PATENT DOCUMENTS

| | | | |
|---|---|---|---|
| 2,674,112 | 4/1954 | Jones | 15/309.1 X |
| 3,044,098 | 7/1962 | Stalson | 15/309.1 X |
| 3,270,364 | 9/1966 | Steele | 15/309.1 |
| 3,736,618 | 6/1973 | Ramsey | 15/309.1 |
| 4,391,016 | 7/1983 | Kawamura et al. | 15/309.1 X |
| 4,591,390 | 5/1986 | Scott et al. | 15/309.1 |
| 4,741,113 | 5/1988 | Burdick et al. | 15/309.1 X |
| 5,125,980 | 6/1992 | Schotter | 15/309.1 X |

*Primary Examiner*—Chris K. Moore

[57] ABSTRACT

A noncontact fiber cleaning and tensioning device for cleaning optical fibers of dust and other particulate matter collected thereon. The noncontact fiber cleaning and tensioning device includes a housing formed from a cleaning and an exhaust section and includes a fiber passage formed therethrough and through which the optical fibers are passed. A series of spray nozzles are mounted to the cleaning section of the housing, and communication with the fiber passage and direct fluid sprays under pressure against the fiber as the fiber moves through the fiber passage to dislodge dust and particulate matter therefrom. A vacuum means is connected to the exhaust section and draws the dust and particulate matter dislodged from the fibers by the fluid sprays through the fiber passage and out through the exhaust housing to exhaust the dislodged particulate matter for collection and removal under controlled conditions.

6 Claims, 2 Drawing Sheets

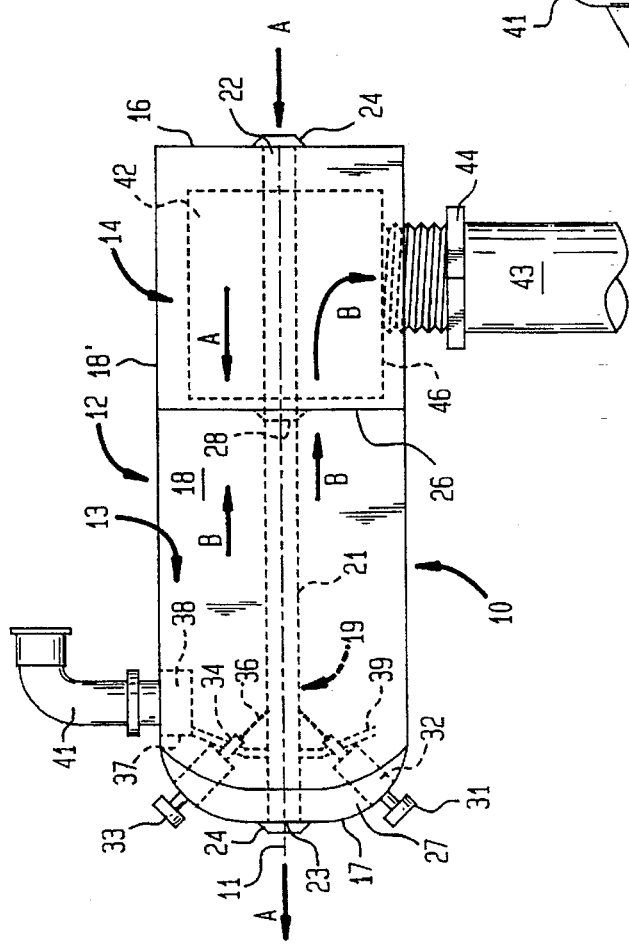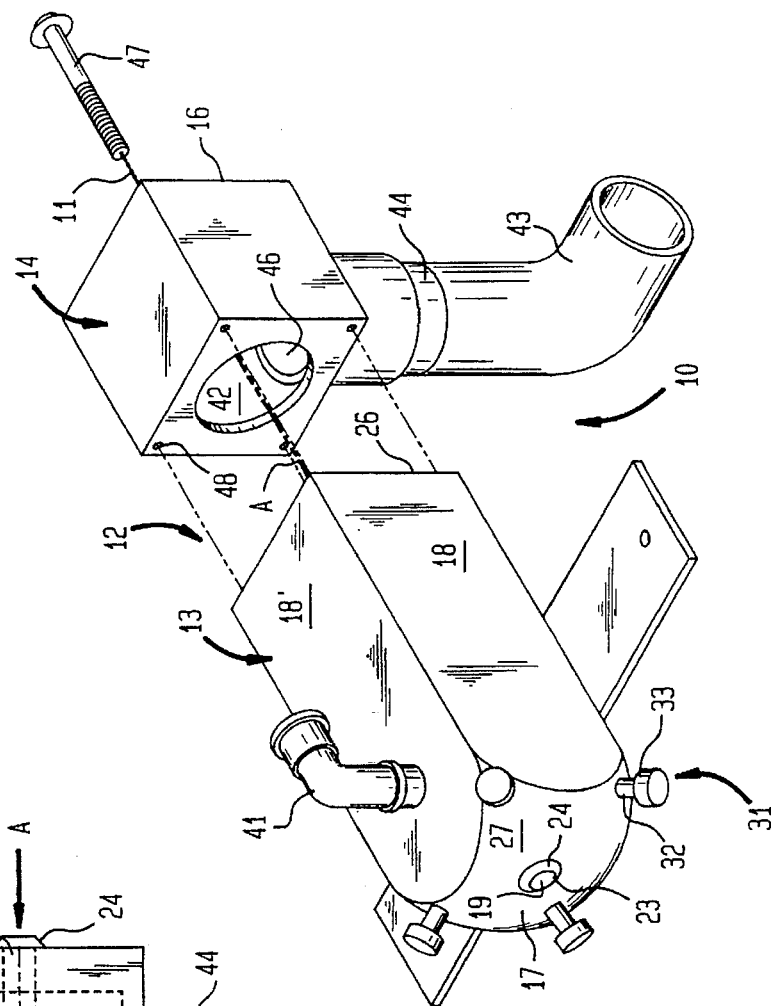

NON-CONTACT FIBER CLEANING AND TENSIONING DEVICE

FIELD OF THE INVENTION

The present invention generally relates to cleaning devices for optical fibers. In particular, the present invention relates to non-contact cleaning and tensioning devices for optical fibers while minimizing breakage or damage thereto.

BACKGROUND OF THE INVENTION

Optical fibers are being used widely today for telecommunications applications such as for telephone and data transmission lines. They offer excellent transmission rates and large band widths, generally at a lower cost and with a significantly smaller size than old, conventional copper wire transmission lines. Additionally, the quality of voice and data transmissions using optical fibers is significantly greater, with much lower signal losses, than with copper wire. Accordingly, the use of optical fibers enables a greater volume of telephone and data transmissions with potentially significantly less expense but with greater clarity and speed.

In the production of optical fibers, the fibers generally are formed from multicomponent glass mixtures from which long, thin fibers are drawn using a fiber-pulling machine, after which the fibers typically are passed through a color application process. During the color application process, the fibers are colored either red, green, etc. for the purpose of coding the fibers for particular applications. The color coding of the fibers is necessary for the connection and splicing of the fibers to their correct mating fibers in the field. Prior to the color application process, however, it is necessary to clean the fibers as thoroughly, as possible, inasmuch as dust and other particulate matter collected on the fibers has a tendency to clog the dies through which the fibers are passed for the color applications, and can cause nonuniform coloring of the fibers. Additionally, the particulate matter clinging on the fibers also can be covered with the coloring material during the color application process. Such covered particles tend to create minor pressure points along the fibers which tend to cause microbending losses along the fibers, impairing the transmission quality and capabilities of the fibers.

Currently, numerous cleaning devices have been developed for cleaning optical fibers of collected particulate matter during the production of the fibers. Such cleaning devices generally have included air wipe devices that direct a flow of air against the fibers to blow off the collected particulate matter. The problem with conventional air wipe cleaning devices is that blowing the particulate matter off of the fibers tends to release the particulate matter into the production room, which generally must be maintained as a clean room environment. The airborne dust and particles also can collect on fibers further downstream in the processing path, affecting the quality and capabilities of the fibers. Additionally, it is important that the fibers be placed under tension during cleaning to ensure that the fibers are thoroughly cleaned of dust, etc., and to avoid the fibers twisting or engaging and being abraded or scraped by surfaces of the cleaning devices. Tensioning of the fibers further is important for winding of the fibers on supply rolls.

Accordingly, it can be seen that a need exists for a method and apparatus for cleaning optical fibers of particulate matter collected thereon during the production of the fibers without the particulate matter being released into the surrounding environment.

SUMMARY OF THE INVENTION

Briefly described, the present invention, in a preferred embodiment thereof, comprises a non-contact cleaning and tensioning device for optical fibers. Generally, the device is positioned immediately upstream from the dies for the applicator units of the color application process along the processing path of an optical fiber, and includes a cleaning section and an exhaust section connected in series. A fiber passage is formed through the cleaning and exhaust sections, and includes an input end and an outlet end formed in the upstream and downstream ends respectively of the cleaning and tensioning device. The optical fiber is received and passed through the fiber passage, which generally is of a diameter substantially greater than the diameter of the fiber so that the fiber passes through the fiber passage without engaging the sidewall thereof.

The cleaning section of the noncontact cleaning and tensioning device generally is formed as a substantially rectangularly shaped block with a portion of the fiber passage extending substantially centrally therethrough. A series of spray nozzles are mounted to the cleaning section, in communication with the fiber passage. The spray nozzles are connected to a fluid supply means and spray a fluid medium under pressure into the fiber passage. Typically, the fluid medium sprayed by the spray nozzles is pressurized air, although water or other fluid solutions can be used as well. The fluid sprays are directed against the fiber passing through the fiber passage, counter to the direction of movement of the fiber, and tend to dislodge or blow off particulate matter clinging to the fiber as the fiber is drawn through the fiber passage. The high pressure counterflow fluid sprays further operate to create a fluidic drag on the surface of the fiber to create a pulling or tensioning effect on the fiber without the fiber coming into contact with materials that could abrade or scrape its surface.

The exhaust section is mounted to the cleaning section, positioned immediately upstream from the cleaning section. The exhaust section includes a vacuum chamber in which an area of negative air pressure is created. A vacuum exhaust means is connected to the vacuum chamber for creating the area of negative air pressure within the vacuum chamber. As particulate matter is dislodged from the fiber moving through the fiber passage by the fluid sprays of the spray nozzles of the cleaning section, a counterflow air stream is drawn through the fiber passage and into the vacuum chamber, and with it the particulate matter dislodged from the optical fiber. The dislodged particulate matter then is exhausted through the vacuum exhaust to remove the particulate matter with the danger of the dislodged particulate matter being released into the clean room environment of the fiber production area being minimized. At the same time, the fiber is subject to additional tensioning due to the vacuum acting thereon, without the fiber coming into contact with any materials that would tend to abrade or scrape the fiber.

In a second embodiment of the invention, the non-contact cleaning and tensioning device can be formed in a clam shell configuration having a fiber passage formed through a single housing. A series of air nozzles, connected in series to a pressurized fluid supply are mounted to the sides and bottom walls of the base and to the top or lid portion of the clam shell directed toward the fiber passage formed through the cleaning and tensioning device. As the fiber is urged along the fiber passage the fiber is subjected to a fluid spray that dislodges particulate matter clinging to the fiber. An exhaust means is positioned upstream and immediately adjacent the air nozzles and tends to draw off the fluid sprays, and with the sprays the particulate matter dislodged from the fiber.

Various objects, features and advantages of the present invention will become apparent upon reading the following specification, one taken in conjunction with the accompanying drawings.

BRIEF DESCRIPTION OF THE DRAWINGS

FIG. 1 is a side elevational view of a first embodiment of the non-contact cleaning and tensioning device for optical fibers, illustrating the passage of a fiber through the housing thereof.

FIG. 2 is an exploded, perspective view showing the noncontact fiber cleaning and tensioning device of FIG. 1 illustrating the cleaning and the off sections thereof.

DETAILED DESCRIPTION OF THE PREFERRED EMBODIMENTS

Figure 3:
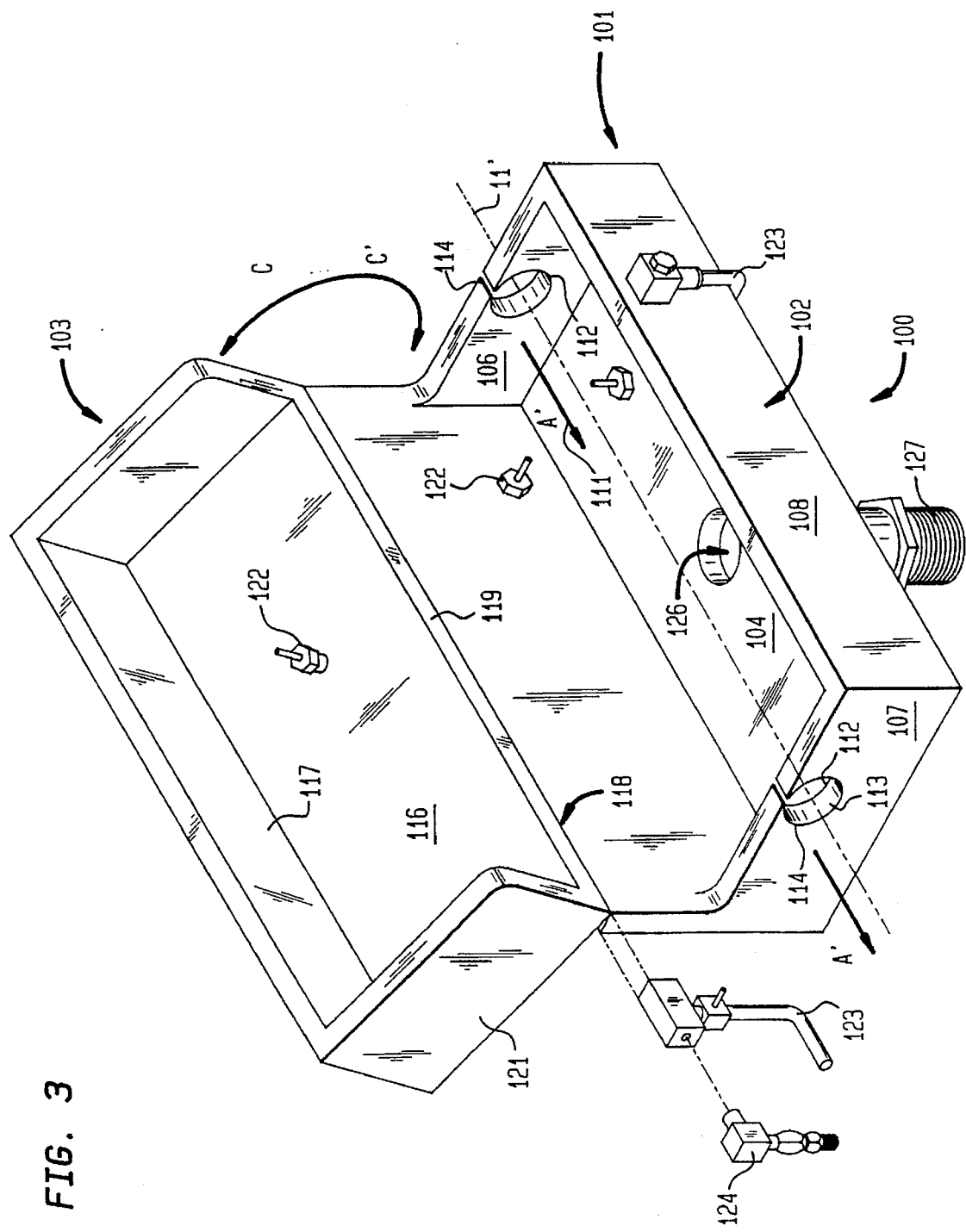
FIG. 3 is a perspective illustration of an additional embodiment of the noncontact fiber cleaning and tensioning device shown in a clam shell type configuration.

The present invention comprises a non-contact fiber cleaning and tensioning device 10 for removing particulate matter from optical fibers 11 after the fibers have been formed and prior to coloring and further processing of the fibers. The cleaning and tensioning device generally is positioned immediately upstream from the dies for the applicator units of the color application process in which the fibers are colored for coding for their particular application (s) and use(s). "Upstream" and "downstream" relate to the direction of movement of the fiber through the processing apparatus. The cleaning and tensioning device 10 generally includes a housing 12 that, in a first embodiment, is formed from a cleaning section 13 and an exhaust section 14 mounted in a series. As FIG. 1 illustrates, the housing generally is a substantially rectangularly shaped block, although various other shapes can be used, and is formed from a rigid, durable material such as nylon, a metal such as aluminum, or a similar material, and includes an upstream end 16, downstream end 17, and side surfaces 18.

A fiber passage 19, shown in dashed lines, is formed through the housing, extending longitudinally through the cleaning and exhaust sections 13 and 14 respectively between the upstream 16 and downstream 17 ends of the housing 12. The fiber passage generally is a substantially cylindrically shaped passage having a diameter substantially greater than that of the fiber 11, and includes a sidewall 21. The fiber passage includes an inlet end 22 formed in the upstream end 16 of the housing 12 and an exit or outlet end 23 formed in the downstream end 17. Bushings 24 are mounted in the upstream and downstream ends of the housing at the inlet and outlet ends of the fiber passage. Each bushing generally is substantially cylindrically shaped, having a diameter approximately equal to the diameter of the fiber passage 19, and typically is formed from aluminum oxide or similar material having a smooth surface that does not tend to abrade or scrape the fiber 11 if the fiber comes into contact therewith as the fiber is drawn through the fiber passage in the direction of arrows A. As FIGS. 1 and 2 illustrate, the cleaning section 13 generally is a substantially rectangularly shaped block having a substantially flat first or proximal end 26 and a rounded second or distal end 27, with fiber passage 19 passing approximately centrally therethrough. A bushing 28 (FIG. 1), formed from aluminum oxide or similar material as the bushings 24, is mounted in the proximal end 26 of the cleaning section along the fiber passage 19. The bushing 28 facilitates the passage of the fiber into and through the cleaning section and protects it against abrasion.

A series of spray nozzles 31 are mounted within the cleaning section 13 at the distal end 27 thereof. Each of the nozzles include(s) a nozzle body 32 having a first end 33 about which a series of helical threads are formed for connection of the nozzle body to the housing, and a second end 34 spaced from the first end and embedded within the housing. A needle tip 36 is mounted to the second end 34 of each nozzle body and extends from the second end into the fiber passage 19. A fluid passage is formed through each nozzle body and through the needle tips 36 thereof to enable the flow of a fluid medium therethrough. As FIG. 1 illustrates, a plenum arrangement, indicated generally by 37, is formed in the cleaning section 13 and includes a fluid entry chamber 38 formed adjacent an upper side surface 18' of the housing. A series of fluid passages, indicated by dashed lines 39, connect the entry chamber with each of the spray nozzles. As shown in FIG. 2, there generally are four spray nozzles positioned at spaced points about the cleaning section and connected to the plenum 38 by fluid channels 39, as shown in FIG. 1.

An air or other fluid medium supply valve 41 is mounted to the upper side surface 18' of the housing, and can be connected to a fluid supply medium (not shown). A fluid medium such as air, water, a combination of both, or other fluid cleaning solutions are received into the plenum 37 of the cleaning section through the supply valve. The fluid medium is supplied to the plenum under pressure, and flows through the plenum and its fluid channels 39 to the spray nozzles. The spray nozzles inject the fluid sprays under pressure into the fiber passage, with the fluid sprays being directed against the fiber 11 being pulled through the fiber passage. The fluid sprays are directed in the direction of arrows B counter to and at an angle to the direction of movement of the fiber 11 through the fluid passage. The fluid generally is applied against the fiber typically at approximately 30 pounds per square inch, although a widely varying range of pressures can be used from as low as 10 pounds per square inch up to pressures at which the fiber is vibrated by the force of the fluid sprays.

The application of the fluid sprays under pressure against the fiber 11 tends to dislodge or blow off any collected dust and particulate matter clinging to the fiber from the formation of the fiber, etc. This dislodged particulate matter is urged in the direction of arrows A rearwardly through the fiber passage toward the exhaust section 14 by means of the pressurized fluid as well as a pressure differential. As a result, as the fiber exits the housing through the outlet end 23 of the fiber passage 19, the fiber has been cleaned substantially of dust and other particulate matter.

Additionally, the pressurized fluid sprays also have the effect of creating a drag or moderate tension on the fiber. Such tensioning of the fiber aids in the rolling of the fiber about a supply spool or roll and further helps maintain the fiber in a straight, stiff attitude as it passes through the housing. This minimizes the potential of the fiber coming into contact with the wall of the fiber passage or other surfaces and being abraded or damaged. Also, by placing the fiber under tension, the fiber is kept from vibrating or twisting as the particulate matter is dislodged as the fiber is pulled through the housing. This ensures that the cleaning process for the fiber thus is more reliable and substantially more complete, and further ensures that the fiber will not tend to pick up dust and other particulate matter that may be cleaning to the sidewalls of the fiber passage.

As shown in FIGS. 1 and 2, the exhaust section 14 generally is a substantially square shaped block having an exhaust chamber 42 formed therein. A vacuum exhaust conduit 43 is connected end to the exhaust section 14 by a connector 44, which typically is a threaded tube or similar connector that extends through the housing and is in communication with the exhaust chamber 42. The vacuum exhaust conduit 43 is connected at its opposite end to a vacuum means (not shown) that draws a flow of air through the vacuum exhaust conduit so as to create a zone of negative air pressure within the exhaust chamber. The dust and other particulate matter dislodged from the fiber in the cleaning section is moved along the fiber passage 19 (FIG. 1) in a direction of arrows B by the force of the fluid sprays, is drawn into the exhaust chamber by the zone of negative air pressure created therein and is exhausted from the exhaust chamber via the vacuum exhaust conduit 43.

Generally, the vacuum applied through the vacuum exhaust conduit is sufficient to overcome the impelling force of the fluid sprays being applied to the fiber to draw the particle laden fluid sprays into the vacuum exhaust conduct. The equalizing of the pressure of the fluid sprays with the vacuum applied in the exhaust chamber ensures that the dislodged particulate matter will be retained within the housing of the cleaning and tensioning device 10 and will be exhausted through the vacuum exhaust conduit instead of passing through the fiber passage and out the inlet end 22 thereof. Further, the potential for dust and additional debris to be pulled into the housing through the inlet end of the fiber passage is minimized. The application of the vacuum within the exhaust chamber also increases the tension applied to the fiber to tension further the fiber passing through the non-contact fiber cleaning and tensioning device.

As shown in FIG. 2, the cleaning and exhaust sections 13 and 14 of the housing 12 are mounted together by a series of bolts 47 (only one of which is shown). The bolts are inserted through a series of aligned bores 48 formed at spaced intervals about the exhaust section and cleaning section. This enables the cleaning section and exhaust section to be separated as needed for additional cleaning or removing of excess debris and blockages in the fiber passage.

FIG. 3 shows an additional embodiment 100 of the present invention in which the housing 101 thereof is formed in a "clam shell" type configuration having a base portion 102 with a lid or top portion 103 hingedly connected thereto. The housing 101 generally is formed from a rigid durable material such as aluminum or other metal, nylon or similar materials. As FIG. 3 illustrates, the base 102 generally includes a bottom wall 104, end walls 106 and 107, and upstanding parallel side walls 108 and 109. The end walls and side walls define a substantially rectangularly shaped chamber 111 within the base 102. Bushings 112 are mounted in the end walls 106 and 107 of the base along the path of the fiber 11' through the noncontact fiber cleaning and tensioning device 100. Each of the bushings is generally a pigtail type bushing having a substantially circular sidewall 113, with an angled cut or gap 114 formed therein, through the top edge of the end walls 106 and 107. The gaps enable the easy and quick insertion or threading of the fiber 11' through the bushings and into the housing 101.

The lid 103 includes a substantially rectangularly shaped top 116 and a substantially U-shaped wall 117 formed about the top 116. As FIG. 3 illustrates, a hinge 118 is attached between the upper edge 119 of sidewall 108 of the base and the rear edge 121 of the lid. The hinge enables the lid to be pivoted in a direction of arrows C and C' toward and away from the base, between a closed position engaging side wall 109 and end wall 106 and 107 of the base and covering the chamber 111 and an opened position tilted away from the base and uncovering the chamber. Typically, a gasket, such as a foam rubber strip or similar material is applied about the lid, for creating a substantially air tight seal between the lid and the base.

Spray nozzles 122 are mounted to the top 116 of the lid into side walls 108 and 109 and bottom wall 104 of the base. The nozzles are positioned so as to direct a fluid spray toward the center of the chamber, toward the path of movement of the fiber 11' through the housing in the direction of arrows A' when the lid is in its closed position, in similar fashion to the nozzles of the first embodiment discussed above. The nozzles are connected to one another by a series of conduits 123 which are generally formed from flexible tubing. The nozzles are connected to a fluid supply means (not shown) by a supply valve 124 mounted to the rear surface of side wall 108. The supply valve is connected to the series of conduits 123 for supplying a fluid medium such as air, water or other solutions under pressure, to the nozzles to dislodge particulate matter collected on the fibers.

A vacuum opening 126 is formed in the bottom wall 104 of the base 102, positioned downstream from the spray nozzles 122. The vacuum opening generally is a substantially circularly shaped or formed in the bottom wall of the base through which particulate matter dislodged from the fiber 11' by the fluid sprays is exhausted from the chamber 111. A vacuum means (not shown) is connected to the housing through the vacuum opening by a connector 127 (that is threadably received within the vacuum opening). The vacuum creates an area of negative air pressure within the chamber at approximately the same pressure as the pressure of the fluid sprays being applied to the fiber, and draws off any particulate matter dislodged from the fiber 11' for collection and removal thereof.

It will be understood that the foregoing relates only to a preferred embodiment of the present invention, and it is anticipated that numerous changes and modifications may be made therein without departing from the spirit and scope of the invention.

I claim:

1. An optical fiber cleaning and tensioning device for removing particulate matter from an optical fiber having a cross-sectional dimension therethrough from an upstream end to a downstream end, comprising:

a substantially hollow housing having an upstream end and a downstream end and means defining a passage through said housing for the optical fiber to be passed therethrough, said passage having a cross-sectional dimension greater than the cross-sectional dimension of the fiber;

said upstream end having a first opening therein for permitting ingress of the optical fiber into said housing, said first opening having a cross-sectional dimension greater than the cross-sectional dimension of the fiber;

first means in said first opening for protecting the fiber to be passed therethrough from abrasion, said first means forming an internal passage having a cross-sectional dimension greater than the cross-sectional dimension of the fiber;

said downstream end of said housing having a second opening therein for permitting egress of the optical fiber from said housing, said second opening having a cross-sectional dimension greater than the cross-sectional dimension of the fiber;

second means in said second opening for protecting the fiber to be passed therethrough from abrasion, said second means forming an internal passage having a cross-sectional dimension greater than the cross-sectional dimension of the fiber;

said housing having a cleaning section adjacent one end thereof, said cleaning section including a fiber passage having a cross-sectional dimension greater than the cross-sectional dimension of the fiber;

said cleaning section including means for applying one or more fluid sprays toward the fiber passage at an angle thereto;

said housing further having an exhaust section adjacent the other end thereof and in series with the cleaning section, said exhaust section including means for exhausting from said housing at least a portion of the fluid sprayed into said housing.

2. The fiber cleaning and tensioning device of claim 1 and wherein said exhaust section includes a vacuum chamber in which a zone of negative air pressure is created for collecting and exhausting the particulate matter dislodged from the fiber.

3. The fiber cleaning and tensioning device as claimed in claim 1 and wherein said means for applying fluid sprays comprises a plurality of spray nozzles mounted in said cleaning section of said housing and each having an outlet end that communicates with said fiber passage for directing a fluid spray into said fiber passage in a direction from said downstream end toward said upstream end.

4. The fiber cleaning and tensioning device of claim 3 and further including means for supplying a flow of air under pressure to said spray nozzles sufficient to apply resistance to the passage of an optical fiber through said passage from said upstream end to said downstream end of said housing.

5. The fiber cleaning and tensioning device of claim 1 and wherein said housing has a clam-shell configuration including a base and a top portion pivotally connected to said base so as to close and seal against said base.

6. The optical fiber cleaning and tensioning device as claimed in claim 1 wherein said cleaning section is adjacent the downstream end of said housing and said exhaust section is adjacent the upstream end thereof.

* * * * *